United States Patent [19]
Bier et al.

[11] Patent Number: 4,735,977

[45] Date of Patent: Apr. 5, 1988

[54] RAPIDLY CRYSTALLIZING POLYPHENYLENE SULPHIDE MATERIAL CONTAINING SULFONIC ACID ESTER

[75] Inventors: Peter Bier, Pittsburgh, Pa.; Klaus Reinking, Wermelskirchen, Fed. Rep. of Germany; Ludwig Bottenbruch; Erhard Tresper, both of Krefeld, Fed. Rep. of Germany

[73] Assignee: Bayer Aktiengesellschaft, Leverkusen, Fed. Rep. of Germany

[21] Appl. No.: 909,165

[22] Filed: Sep. 19, 1986

[30] Foreign Application Priority Data

Oct. 1, 1985 [DE] Fed. Rep. of Germany ....... 3534946

[51] Int. Cl.[4] .............................................. C08L 81/04

[52] U.S. Cl. .................................. 524/158; 524/157; 524/165; 524/609; 528/388; 528/487; 264/331.11

[58] Field of Search ............... 524/158, 157, 165, 609; 528/487, 388; 264/331.11

[56] References Cited

U.S. PATENT DOCUMENTS 3,839,301 10/1974 Scoggins ............................ 524/158
4,529,761 7/1985 Lohmeijer ............................ 524/158

*Primary Examiner*—Harold D. Anderson
*Attorney, Agent, or Firm*—Connolly and Hutz

[57] ABSTRACT

The invention relates to highly crystalline, rapidly crystallizing, thermoplastic materials of polyphenylene sulphides and sulphonic acid esters.

3 Claims, No Drawings

RAPIDLY CRYSTALLIZING POLYPHENYLENE SULPHIDE MATERIAL CONTAINING SULFONIC ACID ESTER

The invention relates to highly crystalline, rapidly crystallizing, thermoplastic materials of polyphenylene sulphides and sulphonic acid esters.

Polyphenylene sulphides can be used as raw materials for the production of fibres, films and shaped articles. Because of their partly crystalline structure, they have outstanding properties, for example a high abrasion resistance, favourable creep properties and a high dimensional accuracy. They are therefore particularly suitable for the production of components exposed to severe mechanical and thermal stress.

The mechanical properties can additionally be improved by incorporating reinforcing materials, for example glass fibres.

However, the production of shaped articles of polyphenylene sulphide by injection moulding is made difficult, since high mould temperatures (>130° C.) and relatively long pressing times are necessary. Mould temperatures of >130° C. or more cannot be used with most injection moulding processes, since the moulds as a rule are designed for a temperature of about 100° C. (heating means: water). Mould equipment which operates with another means of heating, for example oil, and achieves temperatures of >110° C. is generally rare and inconvenient to use. The desired temperatures are thus very frequently not achieved in practice, and the temperature distribution is non-uniform. Because of this, it is economically unattractive to use such high mould temperatures in the injection moulding field.

It is furthermore desirable to achieve high crystallinity as rapidly as possible in order to obtain an optimum level of properties. High crystallinity ensures hardness, dimensional stability and stability of shape, even at higher temperatures. The duration of the injection cycle, which also determines profitability, furthermore depends on the mould dwell time.

These cycles are themselves relatively long at the high mould temperatures for processing of the polyphenylene sulphides and make the progress of polyphenylene sulphide in the production of injection moulded articles difficult.

It has now been found that polyphenylene sulphides have a higher crystallinity and crystallize more rapidly if they contain 0.5–30% by weight, based on the polyphenylene sulphide, of sulphonic acid esters. This enables the degree of crystallinity required for the high stability of shape to be achieved more rapidly and hence allows the polyphenylene sulphide materials to be processed with very much shortened injection cycles.

Another advantage of the polyphenylene sulphide materials according to the invention is the reduction of the mould temperature, without the good crystallization properties being impaired. The injection moulding material cools more rapidly, which means that the mould dwell time is shortened further.

The invention relates to highly crystalline, rapidly crystallizing thermoplastic materials consisting of:
(a) 70–99.5, preferably 90–98.5 and particularly preferably 93–97% by weight of a polyphenylene sulphide with a melt viscosity of at least 5 Pas, preferably of at least 50 Pas, (measured at 306° C. and a shearing stress of $10^2$ Pa) and (b) 0.5–30, preferably 1.5–10 and particularly preferably 3–7% by weight, based on (a) and (b), of a sulphonic acid ester prepared by reacting
(1) an alkylsulphonyl chloride of the formula $$R^1-CH_2-(CHR^2)_n-CH_2 R^3$$

wherein
  $R^1$, $R^2$ and $R^3$ independently of one another are H, Cl or $SO_2Cl$, and at least one of the radicals must be $SO_2Cl$, and
  "n" represents an integer from 3 to 33, preferably from 10 to 16,
and wherein the molar ratio $C/SO_2Cl$ is 35 to 1.25,
(2) with equivalent amounts of a compound of the formula (I)

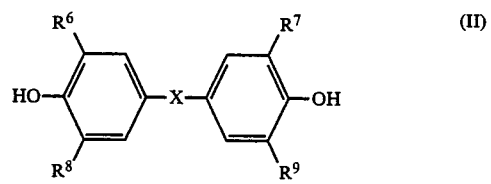

wherein
  $R^4$ denotes a bivalent aromatic radical, preferably a phenylene radical, with 6–14 C atoms and
  $R^5$ denotes an alkyl, cycloalkyl or aryl radical with 1–20 C atoms or H,
and wherein
  m represents the number 0 or 1,
or of the formula (II)

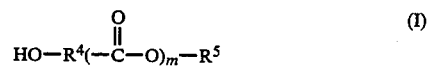

wherein
  $R^6$, $R^7$, $R^8$ and $R^9$ are identical or different and denote a hydrogen atom, an alkyl radical with 1–4 C atoms or a chlorine or bromine atom and X is a single bond, an alkylene or alkylidene radical with 1–8 C atoms, a cycloalkylene or cycloalkylidene radical with 5–15 C atoms, S,

$SO_2$, O or

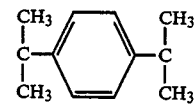

Equivalent in the present connection means that the number of $-SO_2Cl$ radicals of the alkylsulphonyl chloride corresponds to the number of OH groups of the aromatic reaction component.

The present invention furthermore relates to a process for the preparation of highly crystalline, rapidly crystallizing thermoplastic materials, which is characterized in that 70–99.5, preferably 90–98.5 and particularly preferably 93–97% by weight of a polyphenylene sulphide with a melt viscosity of at least 5 Pas, preferably of at least 50 Pas (306° C., $10^2$ Pa) and 0.5–30, preferably 1.5–10 and particularly preferably 3–7% by weight of a sulphonic acid ester obtainable in the above-mentioned manner are mixed by adding the sulphonic acid ester to the polyphenylene sulphide melt and homogenizing the mixture in the melt.

The invention furthermore relates to a process for the injection moulding of these thermoplastic materials obtainable according to the invention, which is characterized in that a mixture of a polyphenylene sulphide with a melt viscosity of at least 5 Pas, preferably of at least 50 Pas (measured at 306° C. at a stress of $10^2$ Pa) and a sulphonic acid ester obtainable in the abovementioned manner is cast in moulds which have a temperature of not more than 120° C., the amount of sulphonic acid ester being chosen so that the injection-moulded polyphenylene sulphide has at least 70% of the crystallinity which is achieved when a shaped article of non-modified polyphenylene sulphide is injection-moulded at mould temperatures of at least 130° C.

Polyarylene sulphides can be prepared in a known manner from dihalogenoaromatics and alkali metal sulphides in solution. (See, for example, U.S. Pat. No. 2,513,188).

Examples of dihalogenoaromatics are p-dichlorobenzene, p-dibromobenzene, 1-chloro-4-bromobenzene, 1,3-dichlorobenzene, 1,3-dibromobenzene and 1-chloro-3-bromobenzene. They can be used by themselves or as a mixture with one another. 1,4-Dichlorobenzene and-/or 1,4-dibromobenzene are particularly preferred.

Other dihalogenoaromatics are, for example, 2,5-dichlorotoluene, 2,5-dichloroxylene, 1-ethyl-2,5-dichlorobenzene, 1-ethyl-2,5-dibromobenzene, 1-ethyl-2-bromo-5-chlorobenzene, 1,2,4,5-tetramethyl-3,5-dichlorobenzene, 1-cyclohexyl-2,5-dichlorobenzene, 1-phenyl-2,5-dichlorobenzene, 1-benzyl-2,4-dichlorobenzene, 1-phenyl-2,5-dibromobenzene, 1-p-tolyl-2,5-dichlorobenzene, 1-p-tolyl-2,5-dibromobenzene, 1-hexyl-2,5-dichlorobenzene and 2,4-dichlorotoluene.

If branched polyarylene sulphides are to be prepared, at least 0.05 mol % of a tri- or tetrahalogenoaromatic is additionally employed.

So that the polyphenylene sulphides remain thermoplastically processable, the content of tri- or tetrahalogenoaromatic should be not more than 7 mol %, based on the dihalogenobenzene employed.

Examples of tri- and tetrahalogenoaromatics are: 1,2,3-trichlorobenzene, 1,2,4-trichlorobenzene, 1,2,4-tribromobenzene, 1,3,5-trichloro-2,4,5-trimethylbenzene, 1,2,3-trichloronaphthalene, 1,2,4-trichloronaphthalene, 1,2,6-trichloronaphthalene, 2,3,4-trichlorotoluene, 2,3,6-trichlorotoluene, 1,2,3,4-tetrachloronaphthalene, 1,2,4,5-tetrachlorobenzene, 2,2'-4,4'-tetrachlorobiphenyl and 1,3,5-trichlorotriazine.

Alkali metal sulphides are employed in the customary amounts and in the customary manner. Sodium sulphide and potassium sulphide, for example, are suitable. Alkali metal sulphides which can be regenerated from bisulphides with alkali metal hydroxides, such as LiOH, NaOH and KOH, can be employed. Mixtures both of the sulphides and of the hydroxides can be employed in all cases.

In general, any polar solvent which guarantees a sufficient solubility of the organic and, if appropriate, inorganic reactants under the reaction conditions can be employed for the reaction. N-Alkyllactams are preferably used.

N-Alkyllactams are those of amino acids with 3–11 C atoms, which can optionally carry substituents on the carbon skeleton, which are inert under the reaction conditions.

Examples of N-alkyllactams which are used are: N-methylcaprolactam, N-ethylcaprolactam, N-isopropylcaprolactam, N-isobutylcaprolactam, N-propylcaprolactam, N-butylcaprolactam, N-cyclohexylcaprolactam, N-methyl-2-pyrrolidone, N-ethyl-2-pyrrolidone, N-isopropyl-2-pyrrolidone, N-isobutyl-2-pyrrolidone, N-propyl-2-pyrrolidone, N-butyl-2-pyrrolidone, N-cyclohexyl-2-pyrrolidone, N-methyl-3-methyl-2-pyrrolidone, N-cyclohexyl-2-pyrrolidone, N-methyl-3-methyl-2-pyrrolidone, N-methyl-3,4,5-trimethyl2-pyrrolidone, N-methyl-2-piperidone, N-ethyl-2-piperidone, N-isobutyl-2-piperidone, N-methyl-6-methyl-2-piperidone and N-methyl-3-ethyl-2-piperidone.

Alkylsulphonyl chlorides which are preferably suitable for the preparation of the sulphonic acid esters to be employed according to the invention contain 1–4, preferably 1–2, $-SO_2-Cl$ groups distributed randomly or regularly over the hydrocarbon chain. Phenols I which are suitable for reaction with these alkylsulphonyl chlorides are, for example, phenyl, diphenyl and naphthyl derivatives, and bisphenols II which are suitable for reaction with these alkylsulphonyl chlorides are, for example, hydroquinone, resorcinol, dihydroxydiphenyl, bis-(hydroxyphenyl)-alkanes, bis-(hydroxyphenyl)-cycloalkanes, bis(hydroxyphenyl) sulphides, bis-(hydroxyphenyl) ethers, bis-(hydroxyphenyl) sulphoxides, bis-(hydroxyphenyl) sulphones, α,α-bis-hydroxyphenyl)-diisopropyl-benzenes and their nuclear-alkylated and nuclear-halogenated compounds.

The sulphonic acid esters to be employed according to the invention are obtained by reaction of alkylsulphonyl chlorides with phenols or phenol derivatives or bisphenols in the presence of an acid-binding agent, predominantly pyridine or sodium hydroxide solution (phenolate).

As a rule, they have a molecular weight of 220 to 2,000.

Examples of suitable sulphonic acid esters are ($C_{12}-C_{18}$-alkylsulphonic acid p-phenyl esters, ($C_{12}-C_{18}$)-alkyl-di(sulphonic acid p-phenyl esters), ($C_{12}-C_{18}$)-alkyl-sulphonic acid p-octylphenyl esters, ($C_{12}-C_{18}$)-alkyl-sulphonic acid p-butoxycarbonylphenyl esters, 2,2-bis-(($C_{12}-C_{18}$)-alkylsulphonic acid 4-phenyl ester) propanes and 2,2-bis-(($C_{12}-C_{18}$)-alkylsulphonic acid 3,5-dichloro-4-phenyl ester) propanes.

The mixture of polyphenylene sulphides and sulphonic acid esters can be prepared on commercially available mixing units. Such suitable mixing units are kneaders and single-screw and twin-screw extruders. For further processing, the resulting mixture can be granulated, after solidification of the melt.

The polyphenylene sulphide compositions can additionally contain fillers and/or reinforcing substances in the form of powders, fibres or mats. Examples of these are metals, such as steel, copper and aluminium, or carbon. Preferred fillers are quartz, talc or kaolin, and preferred reinforcing agents are glass fibres.

The materials can furthermore, if desired, contain inorganic or organic pigments, dyestuffs, flow control agents, mould release agents, UV absorbers and/or stabilizers.

In order to increase the flame-repellancy of the products further, they can additionally contain flame-proofing additives, such as, for example, those which contain halogens, phosphorus or phosphorus-nitrogen, if appropriate in combination with oxides of the elements of sub-group V, such as, for example, antimony oxide.

The rate of crystallization of the polyphenylene sulphide materials can be increased further by addition of inorganic or organic nucleating agents. This is carried out in accordance with standard procedure with the injection moulding materials. The amounts are between 0.05 and 5, preferably between 0.1 and 1% by weight. Microtalc is the preferred nucleating agent.

The polyphenylene sulphide compositions according to the invention are excellent starting materials for the production of films and fibres, preferably for the production of all types of shaped articles by injection moulding.

Examples

The polyphenylene sulphide materials according to the invention are prepared by mixing and homogenizing the basic components (see Table 1) with a 30 mm Werner und Pfleiderer twin-screw extruder at a melt temperature of 310° C. The strands were chopped to granules and dried overnight.

The isothermal rate of crystallization of the dry granules was determined with the aid of a differential scanning calorimeter apparatus. Pretreatment of the samples: heated up to 330° C., kept at this temperature for 1 minute and quenched in liquid nitrogen. The amorphous samples were allowed to crystallize out under isothermal conditions in the differential scanning calorimeter apparatus at 110° C., the change in heat of crystallization as a function of time being recorded (exothermal peak).

The time taken to reach the maximum is recorded as the half-life in Table 1, as a measure of the rate of crystallization.

Samples 1-3 according to the invention shown in Table 1 consist of a polyphenylene sulphide with a melt viscosity of 50 Pas (measured up to 306° C. and a shearing stress of 1,00 Pa), 3% by weight of a sulphonic acid ester and 1% by weight of microtalc. Example 4 is a corresponding polyphenylene sulphide sample without a sulphonic acid ester, for comparison.

$R^1$, $R^2$ and $R^3$ independently of one another are H, Cl or $SO_2Cl$, at least one of which must be $SO_2Cl$, and n represents an integer from 3 to 33, and wherein the molar ratio $C/SO_2Cl$ is 35 to 1.25, with (ii) equivalent amounts of a compound of the formula (I)

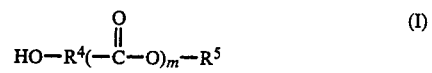

wherein $R^4$ denotes a bivalent aromatic radical with 6-14 Carbon atoms and $R^5$ denotes an alkyl, cycloalkyl or aryl radical with 1-20 Carbon atoms or H, and wherein m represents the number 0 or 1, or the formula (II)

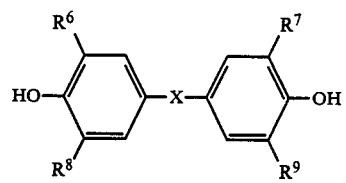

wherein $R^6$, $R^7$, $R^8$ and $R^9$ are identical or different and denote a hydrogen atom, an alkyl radical with 1-4 Carbon atoms or a chlorine or bromine atom and X is a single bond, or X is an alkylene or alkylidene radical with 1-8 Carbon atoms, a cycloalkylene or cycloalkylidene radical with 5-15 Carbon atoms, S,

$SO_2$, —O— or

TABLE 1

| Example | Alkylsulphonic acid ester | Viscosity [cp] | Refractive index $n_D^2$ | Amount [% by weight] | Half life of the isothermal (110° C.) rate of crystallization [seconds] |
|---|---|---|---|---|---|
| 1 | p-phenyl-($C_{12}$–$C_{18}$)—alkylsulphonic acid ester | 900–1200 | 1.497–1.499 | 3 | 12 |
| 2 | p-phenyl-($C_{12}$–$C_{18}$)—alkyl-disulphonic acid ester | 1276 | 1.5205 | 3 | 13 |
| 3 | p-phenyloctyl-($C_{12}$–$C_{18}$)—alkylsulphonic acid ester | 1540 | 1.4975 | 3 | 10 |
| 4 | — | — | — | — | 42 |

We claim:

1. Highly crystalline, rapidly crystallizing thermoplatic material comprising (a) 70–99.5% by weight of a polyphenylene sulphide with a melt viscosity of at least 5 Pacal-seconds, measured at 306° C. and a shearing stress of $10^2$ Pascal units, and (b) 0.5–30% by weight based on (a) and (b) of a sulphonic acid ester prepared by reacting (i) an alkylsulphonyl chloride of the formula $$R^1—CH_2—(CHR^2)_n—CH_2R^3$$

wherein

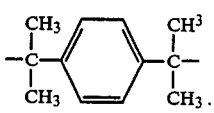

2. Process for the preparation of material according to claim 1, wherein 70–99.5% by weight of the polyphenylene sulphide with a melt viscosity of at least 5 Pascal-seconds, measured at 306° C. and a shearing stress of $10^2$ Pascal units, and 0.5–30% by weight of the sulphonic acid ester are mixed by adding the sulphonic acid ester to the polyphenylene sulphide melt and homogenizing the mixture in the melt.

3. Process for the injection moulding of material according to claim 1 wherein a mixture of the polyphenylene sulphide with a melt viscosity of at least 5 pascal-seconds, measured at 306° C. with a shearing stress of $10^2$ Pascal units, and the sulphonic acid ester is cast in molds which have a temperature of not more than 120° C., the amount of sulphonic acid ester being chosen so that the injection-molded polyphenylene sulphide has at least 70% of the crystallinity which is achieved when a shaped article of non-modified polypheneylene sulphide is injection-molded at mold temperatures of at least 130°.

* * * * *